United States Patent [19]

Angelo et al.

[11] 4,379,544
[45] Apr. 12, 1983

[54] TURBINE TRIP VALVE MECHANISM

[75] Inventors: Eugene V. Angelo, Greensburg, Pa.; Prem Pratap, Westboro, Mass.

[73] Assignee: Elliott Turbomachinery Company, Inc., Jeannette, Pa.

[21] Appl. No.: 259,398

[22] Filed: May 1, 1981

[51] Int. Cl.³ .............................................. F16K 31/44
[52] U.S. Cl. ........................................ 251/74; 74/3.2; 137/57; 251/238; 251/243
[58] Field of Search .................... 73/548; 74/2, 3, 3.2; 137/57; 251/66, 74, 231, 238, 243

[56] References Cited

U.S. PATENT DOCUMENTS

| | | | |
|---|---|---|---|
| 1,839,229 | 1/1932 | Kolts | 251/66 |
| 2,145,820 | 1/1939 | Tucker | 251/74 |
| 2,422,733 | 6/1947 | Jimerson | 137/57 |
| 2,611,382 | 9/1952 | Kuemmerlein et al. | 251/74 |
| 3,461,893 | 8/1969 | Czuszak | 137/57 |
| 3,465,769 | 9/1969 | Shulock et al. | 137/57 |
| 3,685,791 | 8/1972 | Czuszak et al. | 251/69 |

Primary Examiner—George L. Walton
Attorney, Agent, or Firm—Donald F. Daley; David J. Zobkiw

[57] ABSTRACT

A trip mechanism for a trip valve is made up of a reset lever and a bell crank operatively connected through a guide stem which is guidingly received in a flange portion of the valve housing. A valve stem and the guide stem are slidably connected to the reset lever which is provided with a spring bias which tends to move the reset lever in a valve closing position. When the bell crank and guide stem are in engagement the valve is held open and when the bell crank is subjected to an actuating force the bell crank and guide stem become disengaged causing the valve to close under the spring bias and to remain closed until manually reset.

4 Claims, 3 Drawing Figures

TURBINE TRIP VALVE MECHANISM

BACKGROUND OF THE INVENTION

It is conventional practice to provide fluid operated turbine machines with a trip valve and a trip valve mechanism to close the trip valve upon the occurrence of an abnormal condition adversely affecting the operation of the turbine. The closing of the trip valve interrupts the flow of operating fluid to the turbine. Typically, the mechanism for operating the trip valve includes a reset lever or the like connected to the trip valve and biased toward a valve closing position by spring means or the like. The reset lever is restrained against valve closing operation by a restraining member normally positioned in engagement with the reset lever. The restraining member conventionally takes the form of a pivotally mounted lever such as a bell crank and the trip mechanism for moving it out of engagement with the reset lever consists of a centrifugally operated trip pin. Upon overspeed of the turbine, the trip pin engages an arm associated with the restraining member to move it about its pivot and out of engagement with the reset lever to thereby permit the valve to close. In some cases, however, the geometry of the valve body prevents the reset lever from direct connection with the restraining member. Since the reset lever and restraining member are each pivotally mounted, their connection by one or more intermediate members such as to form a three rod linkage, for example, presents problems as to interference with/by other members. This is further complicated by the fact that the trip valve stem typically reciprocates.

SUMMARY OF THE INVENTION

Basically, the present invention connects the reset lever and bell crank through a guide stem which is mounted for reciprocating motion relative to the valve body and is slidably connected to the reset lever. The valve stem is mounted for parallel reciprocal motion in concert with the guide stem and is similarly slidably connected to the reset lever.

It is an object of this invention to provide a trip valve mechanism.

It is a further object of this invention to maintain a trip device in a tripped state until the device is manually reset.

It is an additional object of this invention to provide a trip valve mechanism suitable for use where the geometry of the valve body is such that the reset lever cannot be directly placed over the knife edge. These objects, and others as will become apparent hereinafter, are accomplished by the present invention.

BRIEF DESCRIPTION OF THE DRAWINGS

For a fuller understanding of the present invention, reference should now be made to the following detailed description thereof taken in conjunction with the accompanying drawings wherein.

DESCRIPTION OF THE PREFERRED EMBODIMENT

Figure 1:
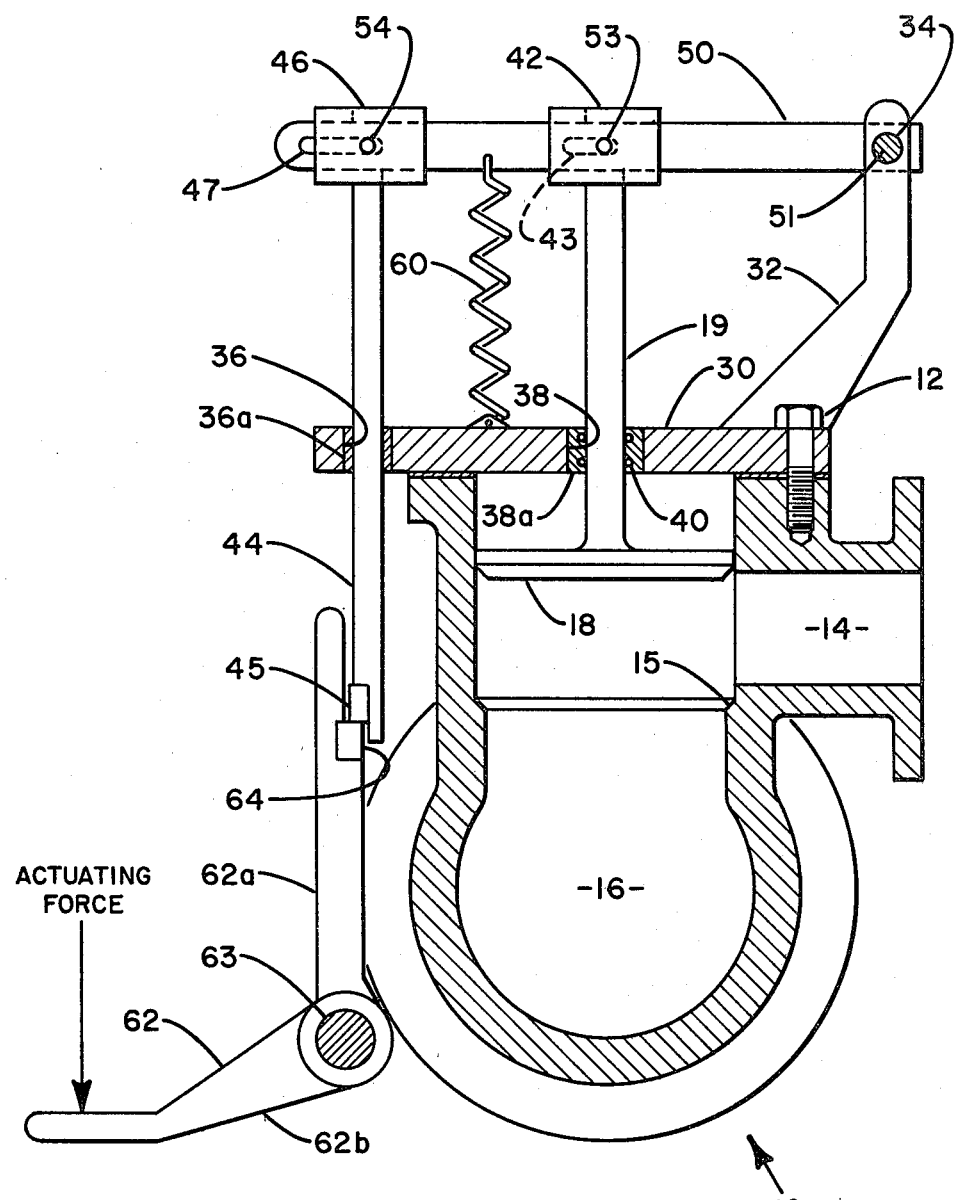
FIG. 1 is a partially sectioned view of the trip valve mechanism of the present invention with the trip valve in the open or untripped position.
Figure 2:
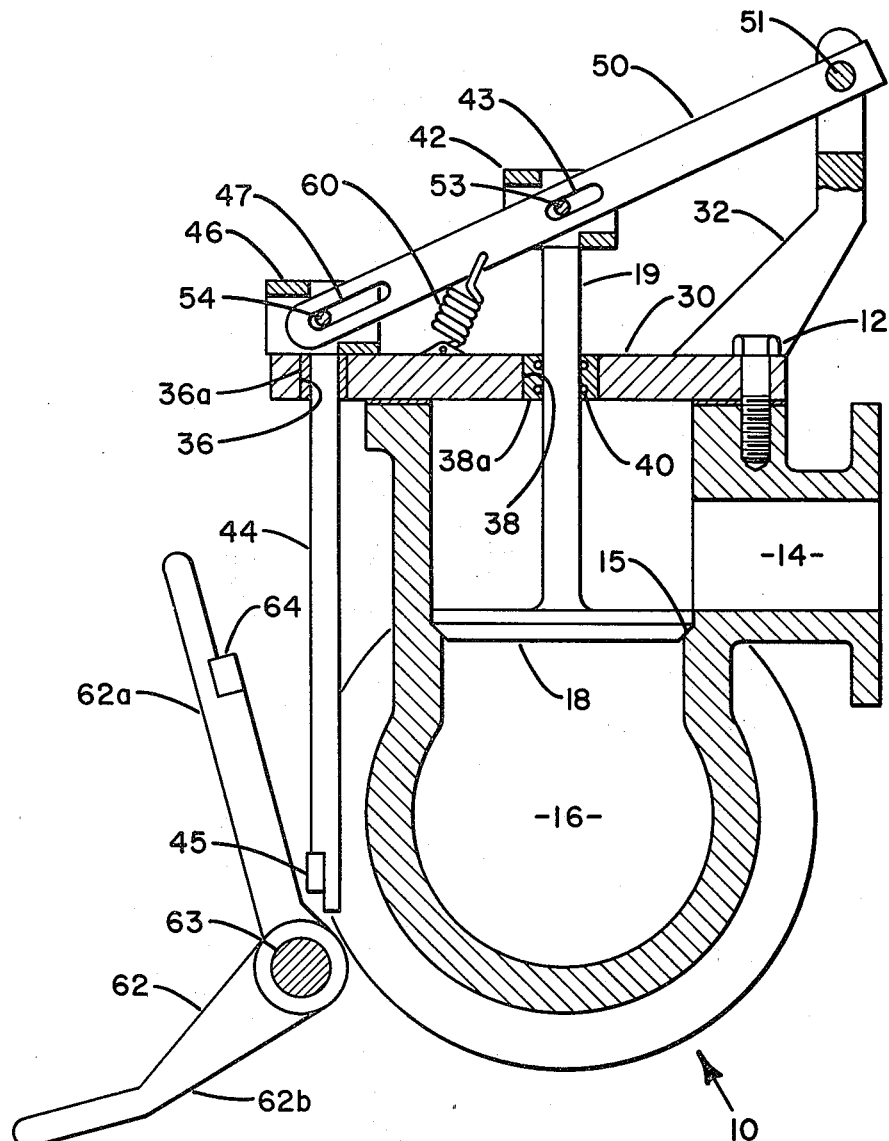
FIG. 2 is a partially sectioned view of the trip valve mechanism of the present invention with the trip valve in the closed or tripped position.

Referring to FIGS. 1 and 2, the valve housing 10 and the valve cover 30 are sealingly secured together by bolts or the like 12 to define a valve cavity having an inlet 14 and an outlet 16 with a valve seat 15 therebetween. A valve member 18 is located in the valve cavity and is adapted to seat on valve seat 15. Valve cover 30 has an upwardly extending arm 32 having a radially extending slot 33 therein with a hole 34 extending through the arm 32 and communicating with slot 33. A first hole, 36, is formed in a flange portion of the cover 30 at a point diametrically opposite the slot 33. A second hole, 38, is formed in the center of cover 30 in alignment with slot 33 and hole 36. Guide bushings 36a and 38a are located in holes 36 and 38, respectively.

Figure 3:
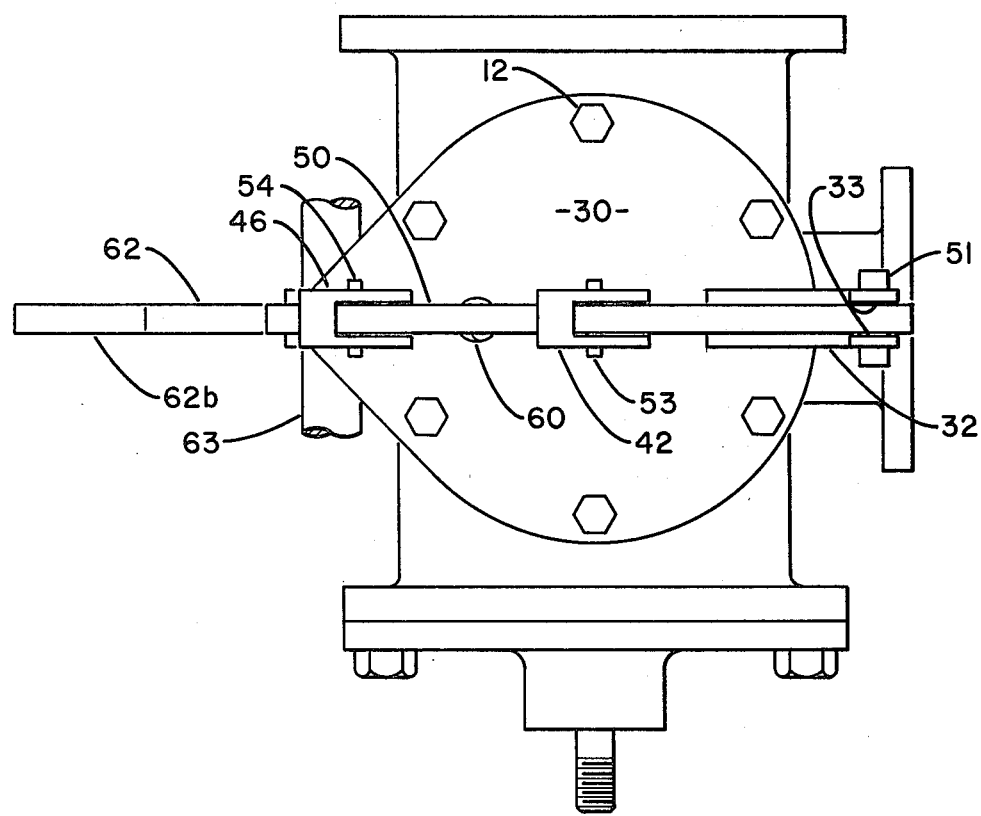
FIG. 3 is a top view of the trip valve mechanism.

Valve stem 19 extends through hole 38 and is sealingly received by o-ring or the like 40 and is guidingly received by guide bushing 38a. Valve stem 19 terminates in guide block 42. Similarly, guide stem 44 is guidingly received in guide bushing 36a and terminates in guide block 46. Reset lever 50 has slots 43 and 47 formed therein. As best shown in FIG. 3, reset lever 50 is located in slot 33 and is secured to arm 32 by pivot pin 51 extending through the hole 34. Reset lever 50 is also slidably connected to guide blocks 42 and 46 by pins 53 and 54, respectively. Tension spring 60 is secured to both reset lever 50 and cover 30 for biasing the lever 50 towards the cover 30 and thereby biasing valve member 18 towards its seated position to close off flow.

Guide stem 44 has a knife edge 45 adapted for engaging the knife edge 64 on arm 62a of bell crank 62. Bell crank 62 is pivotable about rod 63 with arm 62b being adapted to be engaged by a trip pin or the like (not illustrated).

OPERATION

In the open position of FIG. 1, fluid is permitted to flow into the inlet 14, through the valve housing and out the outlet 16. Valve member 18 is held open against the bias of spring 60 by knife edge 45 of guide stem 44 which is located on knife edge 64 of bell crank 62. If an abnormal condition occurs, such as turbine overspeed in the case of a turbine, a trip pin or the like, represented in FIG. 1 as an arrow labeled "actuating force", engages arm 62b of bell crank 62 thereby causing the bell crank 62 to move counterclockwise about rod 63 as illustrated in FIG. 1. The counterclockwise rotation of bell crank 62 causes knife edges 45 and 64 to be disengaged thereby removing the opposition to the bias of spring 60 whereupon reset lever 50 is caused to move counterclockwise about pivot pin 51, as illustrated in FIG. 1, whereupon valve member 18 is caused to move to the FIG. 2 position in which valve member 18 is seated and fluid flow is prevented.

In comparing FIGS. 1 and 2, it will be observed that while bell crank 62 and reset lever 50 each pivot about fixed point or fulcrum, valve stem 19 and guide stem 44 move in parallel paths. Additionally, pins 53 and 54 slide in slots 43 and 47 of reset lever 50, respectively, so that the rotation of reset lever 50 produces parallel movement of stems 19 and 44.

As best shown in FIG. 2, the removal of the "actuating force" above will not permit the resetting of the trip mechanism. To achieve reset, bell crank 62 must be rotated clockwise while reset lever 50 is also rotated clockwise to permit knife edges 45 and 64 to reengage as illustrated in FIG. 1.

Although a preferred embodiment of the present invention has been illustrated and described, other changes will occur to those skilled in the art. It is therefore intended that the scope of the present invention is to be limited only by the scope of the appended claims.

What is claimed is:

1. A trip mechanism for a trip valve controlling the flow of operating fluid to a turbine comprising:

actuating means pivotally mounted and adapted to be moved by an actuating force;

valve body means having an inlet and an outlet with a valve seat therebetween;

a valve member in said valve body means and including a valve stem having an end extending through said valve body means in guiding arrangement whereby said valve member is guidably movable into and out of seating engagement with said valve seat;

guide stem means extending through a portion of said valve body means in guiding arrangement and having one end adapted to be engaged by said actuating means;

reset lever means pivotably secured to said valve body means and slidably secured to said end of said valve stem and the other end of said guide stem means for movement therewith;

biasing means acting on said lever means to move said valve member to the seated position whereby when said guide stem means is engaged by said actuating means said valve member is held out of seating engagement with said valve seat and when said actuating means is acted upon by an actuating force and pivots in response thereto, said guide stem means becomes disengaged from said actuating means permitting said biasing means to move said reset lever means causing said valve member to seat and said guide stem means to move to a position preventing reengagement with said actuating means until manually reset.

2. The trip mechanism of claim 1 wherein said portion of said valve body through which said guide stem means extends is a flange portion having a bushing therein to provide said guiding arrangement.

3. The trip mechanism of claim 1 wherein said valve body means includes a valve cover having guide bushings therein to provide said guiding arrangements for said valve stem and said guide stem means.

4. The trip mechanism of claim 3 wherein said reset lever means is pivotally secured to said valve cover.

* * * * *